United States Patent [19]
Avvisati

[11] Patent Number: 5,465,014
[45] Date of Patent: Nov. 7, 1995

[54] AQUARIUM HEATER OVERRIDE CONTROL SYSTEM

[76] Inventor: Claude G. Avvisati, 1215 Diane La., Elk Grove Village, Ill. 60007

[21] Appl. No.: 373,865

[22] Filed: Jan. 17, 1995

Related U.S. Application Data

[63] Continuation of Ser. No. 819,751, Jan. 13, 1994, abandoned.

[51] Int. Cl.⁶ .................................................. H05B 3/80
[52] U.S. Cl. ................................... 307/117; 219/523
[58] Field of Search .................... 219/481, 487, 219/523; 307/112, 116, 125, 117, 137

[56] References Cited

U.S. PATENT DOCUMENTS

| | | | |
|---|---|---|---|
| 3,842,241 | 10/1974 | Isaacson et al. | 219/526 |
| 4,037,080 | 7/1977 | Owen | 219/328 |
| 4,712,019 | 12/1987 | Nilssen | 307/141 |
| 4,800,292 | 1/1989 | Gillett | 307/117 |
| 5,113,057 | 5/1992 | Tsai | 219/523 |
| 5,191,231 | 3/1993 | Berry | 307/142 |

Primary Examiner—Jeffrey A. Gaffin
Attorney, Agent, or Firm—Michael J. Femal

[57] ABSTRACT

An aquarium heater override control system for use with an aquarium heater in which the system includes a temperature probe placed in the aquarium environment and a control module with temperature settings, visual indications of power presence, circuit testing and reset buttons connected thereto that provides power to the heater so long as the temperature within the aquarium does not exceed a predetermined threshold value of the override control system.

11 Claims, 1 Drawing Sheet

U.S. Patent
Nov. 7, 1995
5,465,014
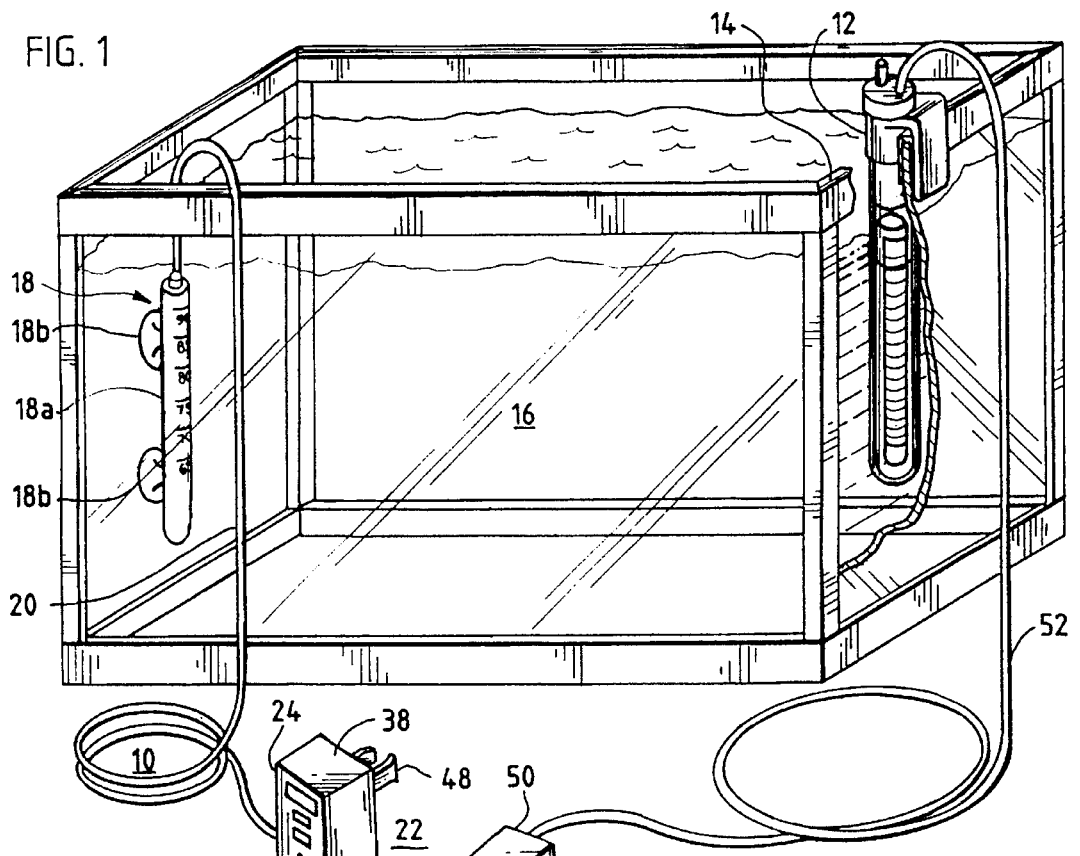
FIG. 1
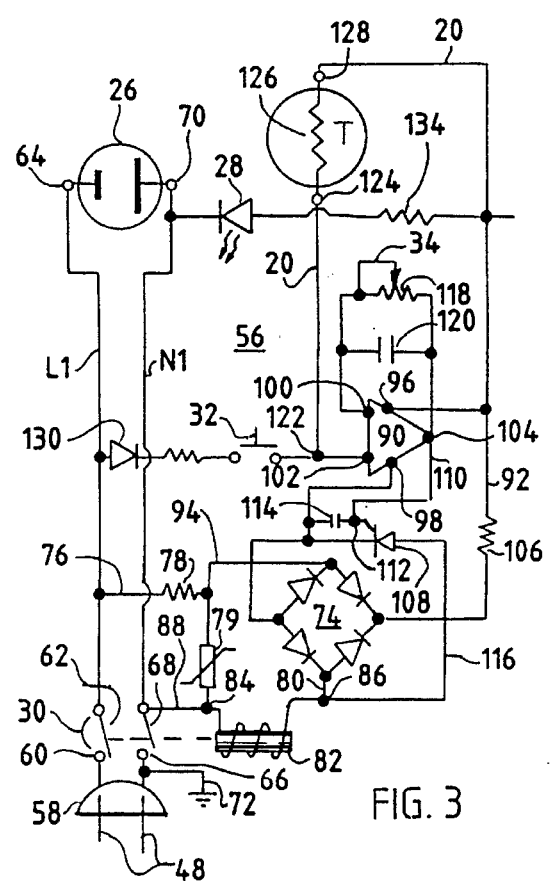
FIG. 2
FIG. 3

AQUARIUM HEATER OVERRIDE CONTROL SYSTEM

CROSS REFERENCE TO RELATED APPLICATIONS

This application is a continuation of U.S. application Ser. No. 07/819,751, filed Jan. 13, 1994, abandoned.

DESCRIPTION

1. Field of Invention

The invention relates to a heater override control system for use with aquarium heaters, and more particularly, to a heater override control system that interrupts the circuit supplying power to a malfunctioning aquarium heater to prevent the temperature within an aquarium from rising to a threshold value that threatens the life of its inhabitants.

2. Background of the Invention

For aquarium hobbyist and for the retail store owners selling various pet inhabitants for aquariums like tropical fish and the like, the bane of their existence is a malfunctioning aquarium heater that remains turned on after sufficient heat is present in the aquarium. For example, almost every aquarium for tropical fish is equipped with an aquarium heater to regulate the water temperature as described in U.S. Pat. No. 4,310,822 to Jager that mounts on the side of the aquarium or a fully submersible heater as described on page 22 of the *Tropical Fish Hobbyist* magazine issue May, 1990 and published by T.F.H. Publications, Inc. Although the bimetallic switch heater of the '822 patent and electronic triac switch heater of previously mentioned fully submersible design are generally reliable in maintaining the desired temperature for the fish within the aquariums, the heater components are subject to eventual failure from the normal wear and tear during aquarium setup, cleaning, water changes and large fish or other aquarium dwellers bumping into the heater casing as well as the mean time to failure rate of any electrical component within the circuitry of the heater as it cycles on and off numerous times each hour in an effort to maintain a constant preset temperature.

The worst possible failure mode for an aquarium heater is when the heater fails in the "on" condition so that the aquarium environment, such as its air or water temperature, quickly rises above the survival temperature of the aquarium inhabitants, especially temperature sensitive inhabitants like tropical fish. Since modern day aquarium heaters all cycle on and off constantly to maintain the desired aquarium temperature, there are many opportunities for an electrical component failure. These heaters are also designed with the state-of-art materials to provide the quickest heat transfer characteristics possible. Unfortunately, these desirable heat transfer characteristics found in the modern aquarium heater designs mean that in matter of minutes the temperature of the aquarium environment like water can rise to a life threatening level for the aquarium inhabitants if the heater fails in the "on" condition. As a result, most tropical fish hobbyist have experienced the loss of all fish within their aquarium due to such a heater failure mode at one time or another. This can also mean a very expensive loss to the hobbyist since some tropical fish can literally cost hundreds of dollars to replace.

SUMMARY OF THE INVENTION

The present invention relates to an aquarium heater override control system which removes the power from the aquarium heater when the temperature of the aquarium exceeds a predetermined threshold value. The override control system includes a probe for sensing the temperature within the aquarium environment and a power module connected thereto having a circuit breaker and a detection circuit responsive to a signal from the probe for operating the circuit breaker when the probe signal exceeds a predetermined temperature reference level. The power module includes a pair of male prongs for plugging into a wall receptacle for a source of A.C. power. The heater power cord is then plugged into a receptacle on the power module and if the heating element of the heater remains closed due to a component failure and the temperature rises above a predetermined threshold value of a rheostat setting on the power module of the override control system, the power is automatically removed from the aquarium heater until the power module is reset by manual actuation of a reset switch button on the power module. The power module within this control system includes power clearing snap-acting contacts and thus when the power module contacts are tripped, the power to the heater is immediately removed and remains removed until the hobbyist manually resets the power module snap-acting contacts after checking out the aquarium heater for malfunctions. The control system further includes a light emitting diode on the front surface panel of the power module that provides a visual indication when the override control system and aquarium heater connected to it are functioning properly. The power module further includes a test circuit operated by a test switch button to check the circuitry within the power module to make sure that it operates properly and that the contacts trip open when an over temperature condition of the aquarium is simulated by pushing the test button.

It is an object of the present invention to provide an aquarium heater override control system for use with an aquarium heater to remove the power from the heater when it malfunctions in the "on" position to save the aquarium inhabitants from life threatening temperatures.

It is a further object of the present invention to provide a heater override control system for use with an aquarium tank heater to remove the power from the heater when it provides excessive heat that is resettable but will again remove the power from the heater if it continue to surpass a predetermined threshold temperature level for the aquarium.

It is a still a further object of the present invention to provide an override heater control system for use with an aquarium heater to remove the power from the heater when it surpasses a threshold heat value while providing a visual indication that the heater has been removed from operation by the override control system.

It is yet another object of the present invention to provide an override heater control system for use with an aquarium environment in which all in service and future purchased aquarium heaters can be connected to the override heater control system without modification to the aquarium heater circuitry.

Finally, it is an object of the present invention to provide an override heater control system for use with an aquarium heater to remove the power from the heater in which the override control circuit is capable of being tested for proper operation under a simulated elevated heat condition in the aquarium.

Other features and advantages of the present invention will be apparent from the following specification taken in conjunction with the accompanying drawings in which there is shown a preferred embodiment of the invention. Reference is made to the claims for interpreting the full scope of the invention which is not necessarily limited or represented by such disclosed embodiment.

BRIEF DESCRIPTION OF THE DRAWINGS

FIG. 1 is a perspective view of an aquarium heater override control system including a power module and a heat sensing probe positioned within the aquarium according to the present invention which is capable of being connected to an aquarium water heater;

FIG. 2 is a top view of a front side panel to a power module used of the override control system in the preferred embodiment as shown in FIG. 1; and FIG. 3 is a schematic circuit of an electronic circuit used in the power module of the override control system in the preferred embodiment as shown in FIG. 1.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Referring to FIG. 1 of the drawings, an aquarium heater override control system 10 is shown connected to a typical aquarium heater 12 which is mounted upon an upper rim 14 of an aquarium tank 16 and positioned within the tank. The aquarium tank 16 may support tropical fish or other inhabitants, aquatic or non-aquatic, both species not shown, which might inhabit an aquarium. The override control system 10 comprises a temperature probe 18, an electrical cord 20 and an override power module 22 connected to the probe 18 via cord 20. The probe 18 includes 5° F. temperature gradients 18a from 65° F. to 90° F. The module 22 includes an override circuit, to be described in greater detail later, a housing 24, a polarized receptacle 26, a light emitting diode 28, a reset button 30, a test button 32 and a slidable temperature set button 34 having 5° F. temperature gradients 34a from 65° F. to 90° F. The receptacle 26, light emitting diode 28, the reset, test and set buttons 30, 32 and 34, respectively, are all mounted on a front side panel 36 of the module 22. The power module 22 further includes a top side 38, a bottom side 40, a back side 42 and left and right sides 44 and 46, respectively. The cord 20 attaches to the top side 38 but could also be attached to any other side of the module 22 depending on design preferences.

The power module 22 further includes a pair of male receptacle prongs 48 extending from the back side 42 for plugging into the female recesses of a wall outlet receptacle, not shown, to provide a source of A.C. power to the override circuitry of the power module 22.

The distinct advantage to the aquarium heater override control system 10 of the present invention is that the control system 10 can be connected to all existing aquarium heaters without any special tools, modifications to existing heater circuitry or unusual effort on the part of the hobbyist or retail store owner. All portable aquarium heaters now in existence or yet to be sold in the retail stores whether submersible or not, typically come with a plug 50 and an equivalent cord 52 attached to the heater 12 as shown in FIG. 1. To implement the override heater control system 10, the hobbyist simply places the probe 18 in the aquarium to be protected from aquarium heater failure in the "on" position and plugs the module 22 via prongs 48 into a wall outlet next to the aquarium 16. Next, the cord 52 of heater 12 via plug 50 having a pair of male prongs 54 is plugged into the female recesses of receptacle 26 on the module 22. Finally, the hobbyist slides the temperature set button 34 to the desired temperature protection setting for the aquarium. The power module 22 will then operate to remove the power from the heater 12 if a temperature exceeding this preselected threshold value is detected by the probe 18 in the aquarium. The circuitry within the power module 22 to achieve this result will be described in detailed later.

An added advantage of the present invention, is that, the hobbyist visually sees the light emitting from diode 28 at glance on the front panel 36 of the module 22 which tells the hobbyist that the override control system 10 and heater control 12 are operational with power to both controls. The hobbyist also can tell at a glance when the heater 12 malfunctions in the "on" position and is providing too much heat to the aquarium. The diode light 28 will be off on the front panel 36 of the override control module 22 indicating that the module 22 has operated to remove power from the heater 12. The hobbyist then checks the heater 12 to see if it has a failed electrical component and, if so, replaces the same before the temperature drops too low in the aquarium. In the case of tropical fish, there is usually sufficient time to get a new heater because it takes a much longer time (several hours) for the water to lose it temperature in the typical heated household.

Turning now to FIG. 3, a simplified override control circuit 56 for the aquarium heater override system 10 is shown. The circuit 56 comprises a polarized plug 58 having the prongs 48 for connecting the control system 10 to a wall outlet that supplies an A.C. source. The prongs 48 are attached to conductors L1 and N1, respectively. The line conductor L1 is connected through a terminal 60 and a snap-acting contact 62 to an end terminal 64 that is connected to the load side of receptacle 26. The neutral conductor N1 is connected through a terminal 66 and a snap-acting contact 68 to an end terminal 70 on the other load side of receptacle 26. The snap-acting contacts 62 and 68 act as a circuit breaker and are ganged together and operate simultaneously on closure and opening. The reset button switch 30 acts as a manual closure of the circuit breaker contacts 62 and 68 after they are opened upon a trip condition. A ground terminal 72 is connected to the neutral conductor N1 before the terminal 66.

The detection and interruption portions of the circuit 56 are powered as follows. A full wave bridge rectifier 74 having avalanche characteristics is connected across the line conductor L1 and the neutral conductor N1 on the load side of the snap-acting contacts 62 and 68 by means of a conductor 76 and a resistor 78 that is connected to one side of the bridge 74 and a conductor 80 that is connected to the other side of the bridge 74. The conductor 80 extends to a solenoid coil 82 and its terminals 84 and 86. A variable resistor 79 is connected between one side of resistor 78 and terminal 84 which is set at a predetermined value. Terminal 86 of the solenoid coil 82 is connected through a conductor 88 to the neutral conductor N1. The bridge 74 provides a rectified power supply for an intergrated circuit component or chip 90 through conductors 92 and 94 that are connected to pins 96 and 98, respectively of the chip 90.

The chip 90 includes therein an operational amplifier, a voltage regulator and a level detector. The pins 96 and 98 represent the voltage regulator portion, and pins designated 100 and 102 represent the operational amplifier portion for level detection having an output pin 104. The voltage regulator stage receives a DC voltage supply supply on the pins 96 and 98 from the bridge 74 through a voltage dropping resistor 106. When the output peak voltage of the amplifier stage exceeds the reference voltage, a D.C. voltage is produced at the pin 104 of the level detector stage which triggers a silicon controlled rectifier (SCR) 108 into conduction through a conductor 110, a terminal 112 to the gate of the SCR 108. A capacitor 114 is connected across the cathode-gate circuit of the SCR 108 to prevent the SCR 108 from triggering and tripping the circuit breaker contacts 62 and 68 due to noise on the circuit 56 which may be amplified by its chip 90.

When SCR 108 is triggered into conduction, a line voltage is applied to the solenoid coil 82 causing its plunger to open the snap-acting contacts 62 and 68 to interrupt the power line conductors L1 and N1 of circuit 56 and thus removing power from the heater 12 connected thereto. When the SCR 108 conducts, a circuit is completed from the neutral conductor N1 through the conductor 88, the solenoid coil 82, a conductor 116, the SCR 108, conductors 94 and 76 and resistor 78 to L1.

Pin 100 of the chip 90 receives a reference voltage proportional to the temperature setting of the slidable button 34 on the front panel 36 of the module 22 which sets the variable resistance of a rheostat 118 connected between output pin 104 and the input pin 100. A capacitor 120 is connected in parallel across the rheostat 118 to improve the noise immunity of the negative feedback path. Pin 102, an inverting input terminal of the operational amplifier, is connected to a terminal 122 and through conductor cord 20 to a terminal 124 in the probe 18.

In addition, the probe 18 placed within the aquarium includes visual thermometer settings 18a on its surface of any known type to compare the temperature within the aquarium with the temperature settings on the power module 22 as a backup check of the overall control system 10. Also, the probe 18 includes suction feet 18b for attaching the probe to the side of the aquarium 16.

The probe 18 includes a temperature dependent resistance 126 that is connected through a terminal 128 within the probe 18 through conductor cord 20 to conductor 92. When the temperature sensed by the temperature dependent resistance 126 at probe 18 induces a voltage at pin 102 that exceeds the reference voltage or the predetermined threshold value for the temperature (temperature setting of button 34) at pin 100, the D.C. output voltage at pin 104 gates the SCR 108 into conduction and in turn causes the solenoid 82 to be energized. This causes the contacts 62 and 68 to drop out which removes the A.C. source across load terminals 64 and 70 and receptacle 26. The aquarium heater 12 connected to receptacle 26 of the module 22 through its cord 50 and plug 52 is thus removed from a source of power.

The test button 32 closes a circuit between the conductor L1 and pin 102 through a diode 130 and a dropping resistor 132. This induces a voltage at pin 102 that exceeds the reference voltage at pin 100 causing the operational amplifier to produce and output signal at pin 104 to gate the SCR 108 into conduction and thereby tripping the contacts 62 and 68 into the open condition simulating an over heat condition in the aquarium and thereby removing power from the heater 12.

Finally, the override control circuit 56 within the module 22 includes a light emitting diode 28 which is connected between the bridge 74 and conductor N1 through conductor 92, resistor 106 and a dropping resistor 134. As long as the contacts 62 and 68 of the breaker mechanism are closed the diode 28 emits light for a visual indication that the override control system 10 is providing power to the heater 12 and that the heater 12 is functioning normally. When the light indication from the diode 28 is missing, the power module 22 of the override control system 10 can be reset by pushing down the manual reset button 30 closing the snap-action contacts 62 and 68 which are ganged together and thereby reapplying the power to the heater 12. If the heater 12 is defective and its heating element remains continuously energized, the override control system 10 will once again remove supply power to the heater 12 when the predetermined threshold temperature is exceeded. The diode 28 will once again turn off indicating that power is removed from the heater 12. The hobbyist at this point will have an indication that the heater should probably be checked or replaced at once.

Although the circuit diagram shown in FIG. 3 depicts one embodiment for the overall system, there are more simplified circuits possible that would provide the basic protection for aquarium hobbyists in keeping with the concepts of this invention. For example, many portions of the circuitry shown in FIG. 3 are capable of being eliminated to simplify the overall circuitry. The power module 22 could have just conductors L1 and N1 connected at one end to the male prongs extending from the housing to plug into a wall receptacle. Conductor L1 would then connect in series to the probe 18 which is also simplified by just having a normally closed thermally sensitive contacts like those described in U.S. Pat. No. 4,310,822 that operate at a preset temperature like 85 or 95 degrees Fahrenheit. So if the water temperature exceeds 85 or 95 degrees, the bimetallic strip opens the contacts in the probe 18 removing power from the heater cord plugged into the power module 22. There would be a hysteresis effect built into such a simplified circuit and when the temperature in the aquarium fell several degrees below the 85 or 95 degree preset temperature operation level, the contacts would close and power would be restored to the heater once again.

While the specific embodiments have been illustrated and described, numerous modifications are possible without departing from the scope or spirit of the invention. There are many different circuit variations possible to achieve the same result such as a conventional thermostat being placed in the probe and when the temperature exceeds the thermostat setting, the power would be removed from the module 20.

I claim:

1. A stand alone and portable aquarium tank temperature override control system for use with a separate and/or portable aquarium heater, comprising:

a sensing means, located within or in thermal contact with a surface of an aquarium tank and responsive to the temperature of the aquarium tank environment, for generating a control signal proportional to the temperature within the aquarium tank; and a power control means connected to the sensing means and the aquarium heater responsive to the control signal for disconnecting the power from the aquarium heater when the temperature of the aquarium tank environment exceeds a predetermined threshold value to save aquarium inhabitants if the heater fails in the "on" condition.

2. The temperature override control system of claim 1, wherein said sensing means includes a temperature dependent resistance that changes its value with changes in temperature to produce the control signal.

3. The temperature override control system of claim 1, wherein the aquarium heater includes a power cord and plug; and the power control means includes a housing, a power control circuit within said house, a plug extending from said housing and connected to said control circuit for connecting said circuit to an A.C. source at a wall outlet, a receptacle mounted on said housing and connected to said circuit for receiving said heater plug, means connected to said circuit for setting a predetermined threshold value for the temperature of the aquarium, and means connected to said circuit for comparing the control signal to the preset value of temperature and when the control signal exceeds said preset value then the control circuit disconnects said receptacle from the A.C. source.

4. An aquarium heater override control system for use in an aquarium environment normally under temperature control by a separate primary aquarium heater having a power cord and plug connected to a wall outlet for an A.C. source of power, said override control system comprising:

a portable probe generally placed within said aquarium environment having a means responsive to temperature fluctuations for generating an output signal proportional to the temperature within said aquarium environment;

a power module having a power circuit, a pair of male prongs connected to the power circuit for connecting the power circuit to a wall outlet for an A.C. source of power, a means for breaking the power circuit, a receptacle mounted on said power module and connected to the power circuit for plugging the heater into the A.C. source via said power module through its plug and cord, a detection circuit means connected to said power circuit and to said breaking means, responsive to said output signal generated by said probe and having a means for setting the desired reference temperature for the aquarium environment, for operating said breaking means whenever the output signal from the probe exceeds said reference temperature setting on said power module.

5. The control system of claim 4, wherein the generating means includes a temperature dependent resistance.

6. The control system of claim 4, wherein the power module further includes a light emitting diode connected connected in the power circuit after said breaking means for providing a light indication that the override control system is operational and that a temperature exceeding the reference temperature setting has not occurred.

7. The control system of claim 4, wherein the breaking means includes a pair of snap-acting contacts, a solenoid mechanically connected to said contacts.

8. The control system of claim 7, wherein the power module further includes a means for resetting the snap-acting contacts.

9. The control system of claim 4, wherein the power module further includes a means for simulating the control signal that exceeds said reference temperature setting of the power module to operate said breaking means.

10. An aquarium heater override control system, comprising:

a portable means responsive to the temperature placed within an aquarium environment for generating a control signal proportional to the aquarium temperature; and a means responsive to the control signal having a power circuit connectable to an A.C. source and a receptacle connected to the power circuit into which a power cord from an aquarium heater is plugged for interrupting the A.C. source to the power circuit when the control signal exceeds a predetermined threshold value.

11. In a stand alone and portable aquarium tank temperature override control system for controlling a separate and/or portable aquarium heater mountable within an aquarium tank to heat the aquarium tank environment, said aquarium heater having a power cord for connecting to a power source, a method of removing the power to the aquarium heater comprising the steps of:

locating a portable temperature probe within or in contact with the surface of the aquarium tank to measure the temperature of the aquarium tank environment;

connecting an override power module having an override circuit to the power source and to the temperature probe, respectively;

connecting the power cord of the aquarium heater to the override power module; and removing the power from the aquarium heater by having the override circuit disconnect the power module from the power source when the temperature of the aquarium tank environment as measured by the temperature probe exceeds a predetermined threshold value.

* * * * *